Jan. 15, 1952 G. T. KODAMA 2,582,931
ELECTRICAL CAPACITOR
Filed June 28, 1948

INVENTOR.
GEORGE T. KODAMA
BY
ATTORNEY

Patented Jan. 15, 1952

2,582,931

UNITED STATES PATENT OFFICE 2,582,931

ELECTRICAL CAPACITOR

George T. Kodama, Milwaukee, Wis., assignor to Herlec Corporation, Milwaukee, Wis., a corporation of Wisconsin Application June 28, 1948, Serial No. 35,550

1 Claim. (Cl. 175—41)

This invention relates to improvements in an electric capacitor and particularly to a capacitor of high value but of relatively small size and of simplified construction.

The present trend toward more complex electronic circuits to be enclosed in smaller and smaller spaces, requires that the fixed capacitors for such circuits, be constructed to require a minimum space and be mountable and connectible by the simplest possible means. If the attaching ears or lugs are simple stampings of minimum thickness and are directly attached to the conductive coatings, the capacitor is as cheap as possible for a given value of capacitance. If the same means are used both for supporting the capacitor in the desired position and for connecting the capacitor with other elements in the circuit, the capacitor is reduced to its indispensable elements which further reduces cost thereof.

It is, therefore, one object of the present invention to provide an electric capacitor reduced to the minimum number of parts and to the minimum size for a given value of capacitance, the elements of the capacitor being such that some of the parts have the dual function of supporting the structure and of acting as terminals.

Another object of the invention is to provide a fixed capacitor for electric circuits in which the various elements can be made and combined at the minimum cost, and in which the time and labor required for inserting the capacitor in the circuit is reduced to a minimum.

Objects and advantages other than those above set forth will be apparent from the following description of my invention.

Generally, the present invention comprises a sheet dielectric shown as being of disk shape, the dielectric being made of high dielectric constant and self-supporting material such as one of the ceramics of high titanium dioxide content now known. The dielectric disk has formed on the opposite sides thereof conductive coatings comprising the capacitor plates, the three elements above thus forming the major electrically active portions of a capacitor. Connecting and supporting members are made as simple stampings with an attaching or base portion and one or more connecting portions or lugs extending from the attaching portions. The connecting and supporting members are severally attached to the conductive plates by solder and all but the terminal portions of the lugs are preferably coated with a thermo-setting material to prevent absorption of gases or liquids which would vary the capacitance of the device while in use.

In manufacture, the dielectric sheet is shaped and fired as is well known. The conductive plates are formed by coating the opposing sides of the dielectric, over equal and opposite areas, by one of the known methods, such as with a mixture including a salt of a metal, the metallic salt then being reduced to the metal by one of the processes now well known. The connecting and supporting members are individually shaped as simple stampings with an attaching portion and one or more lugs extending at right angles to such attaching portion. The base portions of the attaching members are perforated to provide receptacles for solder by which the members are joined to the conductive plates. The completed capacitor is then dipped in a thermo-setting plastic, the plastic is wiped off the lug ends and the entire device is heated to harden the plastic. The completed device is then ready for packaging and shipping to users.

Referring more particularly to the drawings, 10 designates the dielectric formed as a relatively thin disk of a high dielectric ceramic with two surfaces thereof formed substantially as planes. Metallic coatings 11 and 12 are formed on opposite sides of the dielectric, such coatings being themselves incapable of self-support and being supported by the dielectric to which such coatings are bonded.

Figure 1:
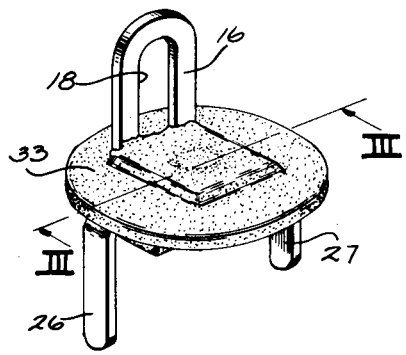
Fig. 1 is a perspective view of a completed capacitor according to the present invention.
Figure 2:
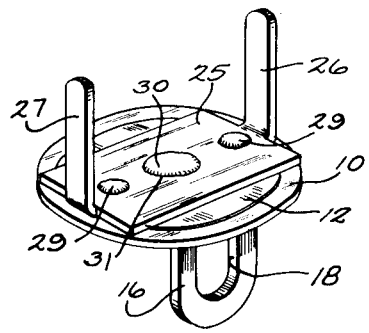
Fig. 2 is another perspective view of the capacitor with the protective coating omitted, and looking at the side opposite that shown in Fig. 1.
Figure 3:
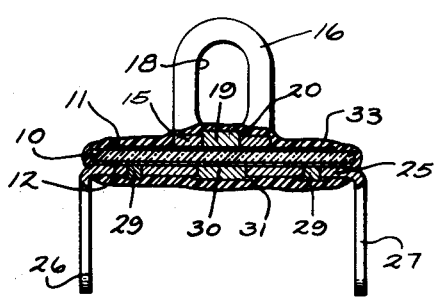
Fig. 3 is a cross-sectional view on the plane of line III—III of Fig. 1.
Figure 4:
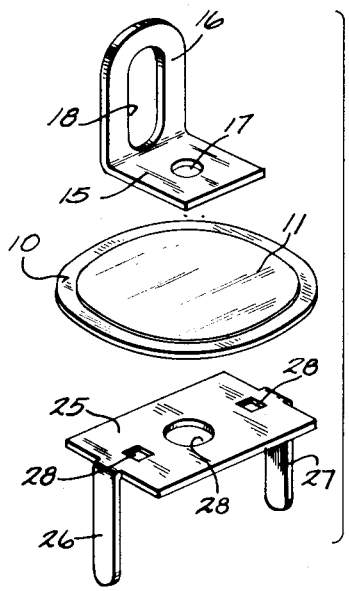
Fig. 4 is an "exploded" perspective of the several elements of the capacitor.

One supporting and connecting member is made with an attaching base 15 and a lug 16, having apertures therethrough as shown at 17 and 18 respectively. The base portion 15 is bent at an angle to the connecting lug 16 and solder is placed in aperture 17 as indicated at 19 in Fig. 3, the solder flowing between the adjacent surfaces of plate 11 and base 15 and attaching to the conductive plate 11, to the sides of the aperture 17 and flowing beyond the edge of the aperture for a slight distance to form a head 20, as shown.

Another supporting and attaching member is formed with a base portion 25 of considerably greater area than the base 15 of the first member to provide an extensive area for joining the conductive plate with such base. Connecting lugs 26, 27 are formed integral with the base 25 and extend at an angle from one side thereof to provide a plurality of mounting ears of a size most readily secured to other portions of an electronic device. The attaching portion 25 is formed with a plurality of apertures 28 to provide receptacles for solder as shown at 29 and 30 in Fig. 3, the solder plugs again being joined to conductive plate 12 and the edges of apertures 28, 29 and being formed with heads as shown at 31. The enlarged base portion and plural apertures of member 25 produce such joining of the member with condutcive plate 12 that even exceptionally rough handling in assembly, cannot break the joint. As indicated above, after the components have been assembled, the assembly is covered with plastic coating 33.

It will thus be seen that the present capacitor comprises only the indispensable elements of a dielectric, conductive plates and members serving both as electric terminals for the plates and as mounting and supporting means for the capacitor. The dielectric is made in the most efficient shape for maximum area on which the coatings may be most readily placed by simple means. The capacitor has the same inter-component effect about its entire periphery. The forming and the attachment of the mounting-terminal members is performed by the speediest of mass production operations. The quantity of materials used and the time required both for manufacturing and assembling the complete capacitor has been so reduced as to make a satisfactory capacitor available to the public at the minimum cost.

As many apparently widely different embodiments of the invention may be made without departing from the spirit and scope hereof, it is to be understood that the invention is not limited to its specific embodiments except as defined in the appended claims.

I claim:

A fixed electrical capacitor comprising a self-supporting ceramic dielectric sheet having two electrodes, each in the form of a metallic coating extending over and bonded to substantial portions of the opposite sides of the sheet, and two electrically conductive terminals, each having a flat base secured by a metal-to-metal bond to the respective coatings, said terminals also having lugs extending angularly from each of said bases to provide electrical connection sites, at least one of said terminals being relatively rigid and having a base bonded to a coating across the entire coating span to effectively support the entire condenser and re-enforce the dielectric, and the relatively rigid terminal is bonded in place by solder and its base has at least one perforation filled with bonding solder headed over the open end of the perforation to improve the bonding of the terminal.

GEORGE T. KODAMA.

REFERENCES CITED

The following references are of record in the file of this patent:

UNITED STATES PATENTS

| Number | Name | Date |
|---|---|---|
| 1,948,506 | Caine | Feb. 27, 1934 |
| 2,235,489 | Rath | Mar. 18, 1941 |

FOREIGN PATENTS

| Number | Country | Date |
|---|---|---|
| 110,462 | Australia | May 9, 1940 |
| 524,435 | Great Britain | Aug. 6, 1940 |
| 592,316 | Great Britain | Sept. 15, 1947 |

OTHER REFERENCES

"Erie Button Silver Mica Condenser," catalog sheet of Erie Resistor Corp., July 31, 1945.